Dec. 30, 1952  S. R. JOHNSON ET AL  2,623,590
APPARATUS FOR CUTTING SCROLLED SHEETS
FROM CONTINUOUSLY FED METAL STRIPS
Filed July 11, 1947  11 Sheets-Sheet 1

Inventors
Scott R. Johnson,
James M. Royal,
Herbert Schrader.
By
Mason, Porter, Diller & Stewart
Attorneys.

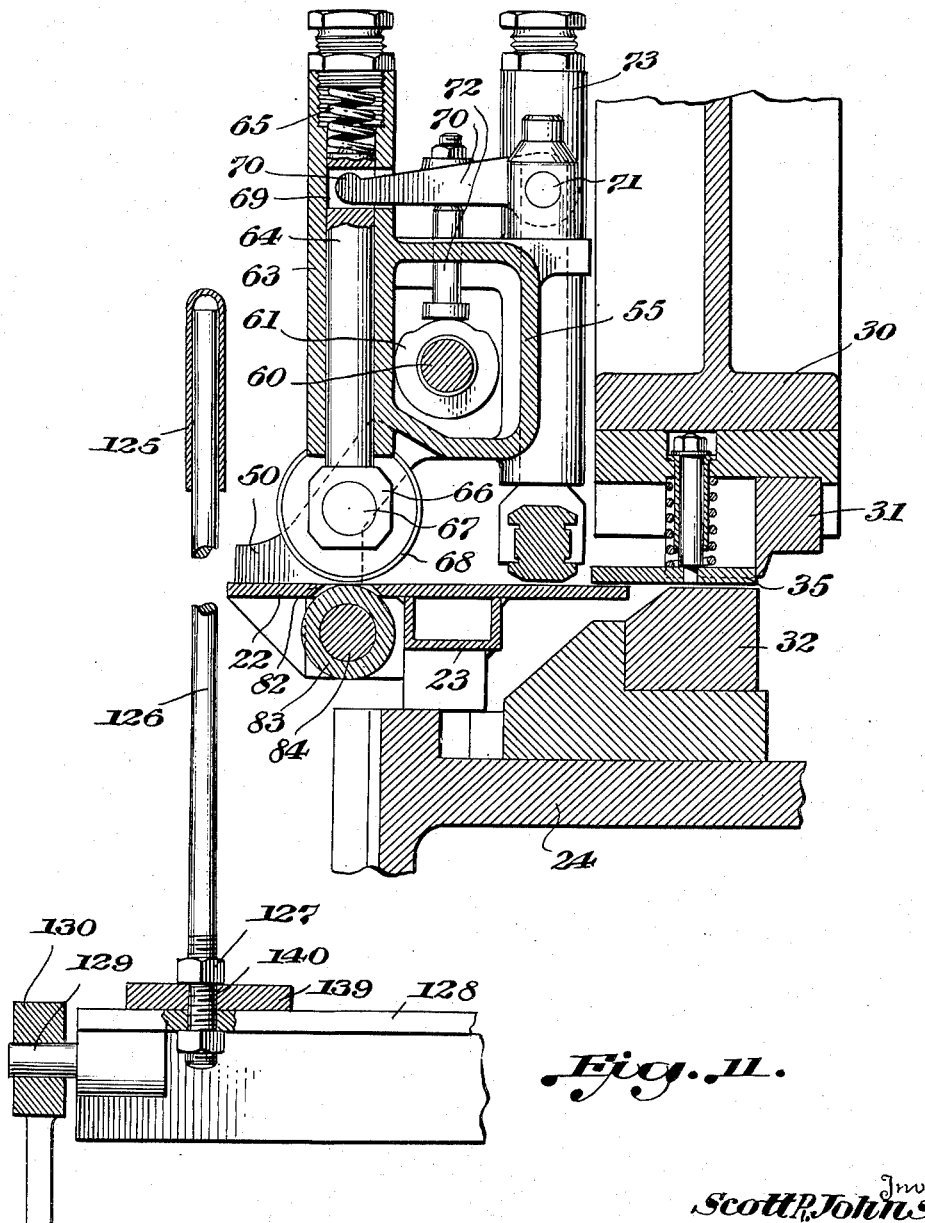

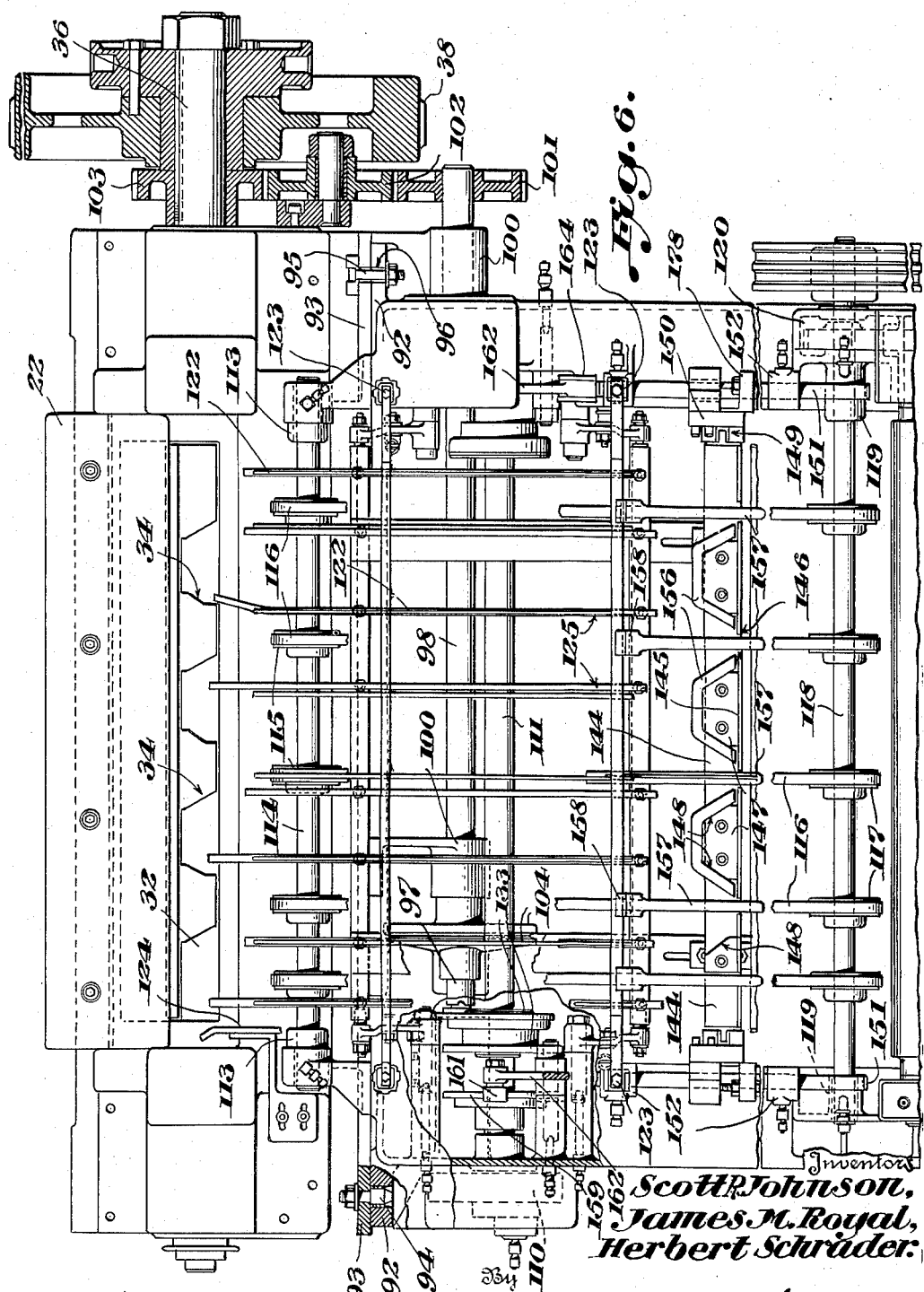

Dec. 30, 1952 S. R. JOHNSON ET AL 2,623,590
APPARATUS FOR CUTTING SCROLLED SHEETS
FROM CONTINUOUSLY FED METAL STRIPS
Filed July 11, 1947 11 Sheets-Sheet 7
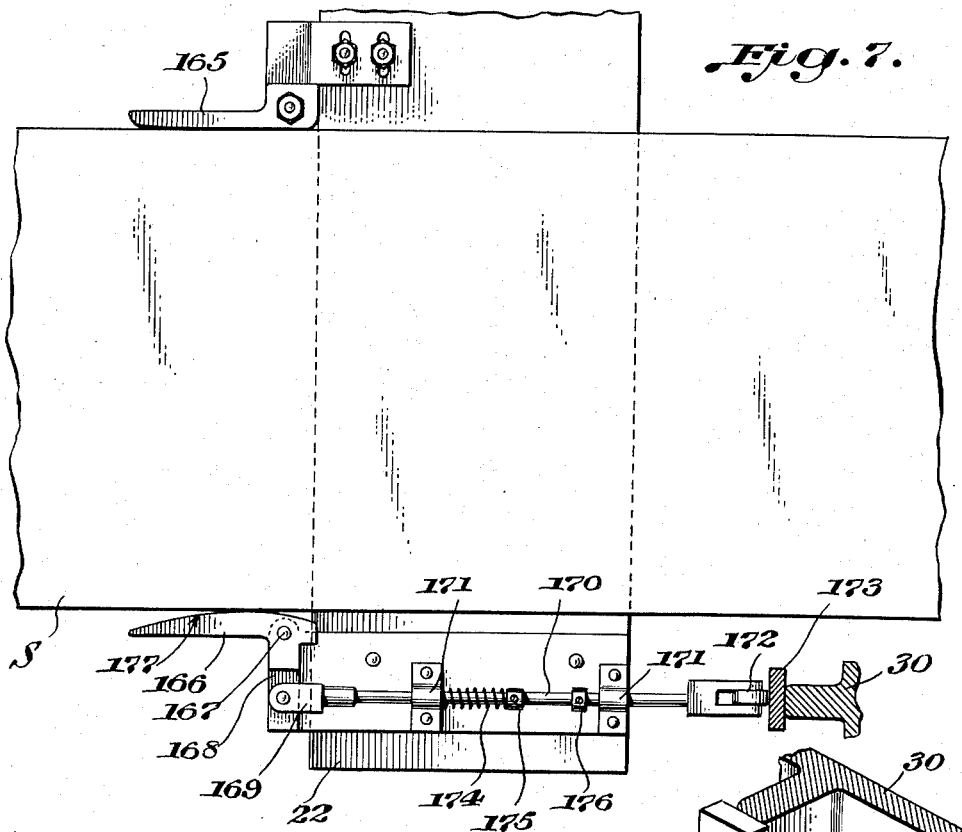
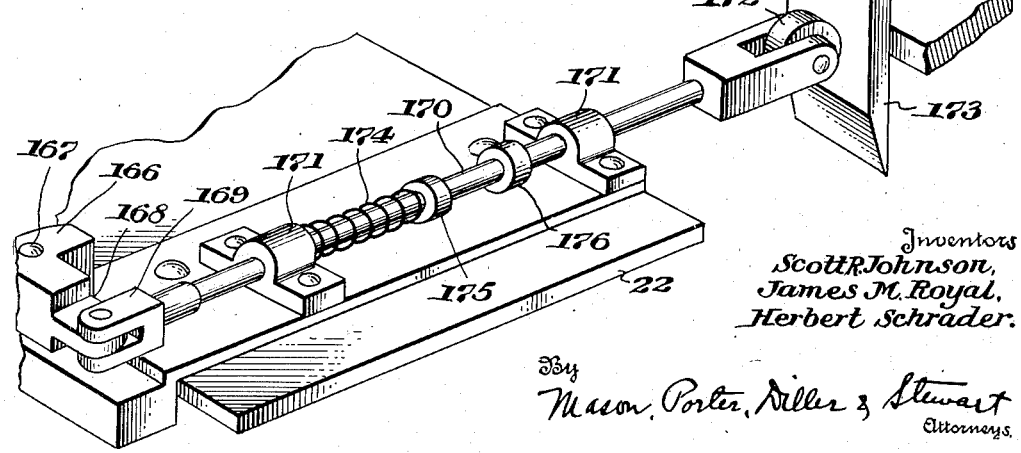
Inventors
Scott R. Johnson,
James M. Royal,
Herbert Schrader.
By Mason, Porter, Diller & Stewart
Attorneys.

Dec. 30, 1952  S. R. JOHNSON ET AL  2,623,590
APPARATUS FOR CUTTING SCROLLED SHEETS
FROM CONTINUOUSLY FED METAL STRIPS
Filed July 11, 1947   11 Sheets-Sheet 8

Inventors
Scott R. Johnson,
James M. Royal,
Herbert Schrader.
By
Mason, Porter, Diller & Stewart
Attorneys.

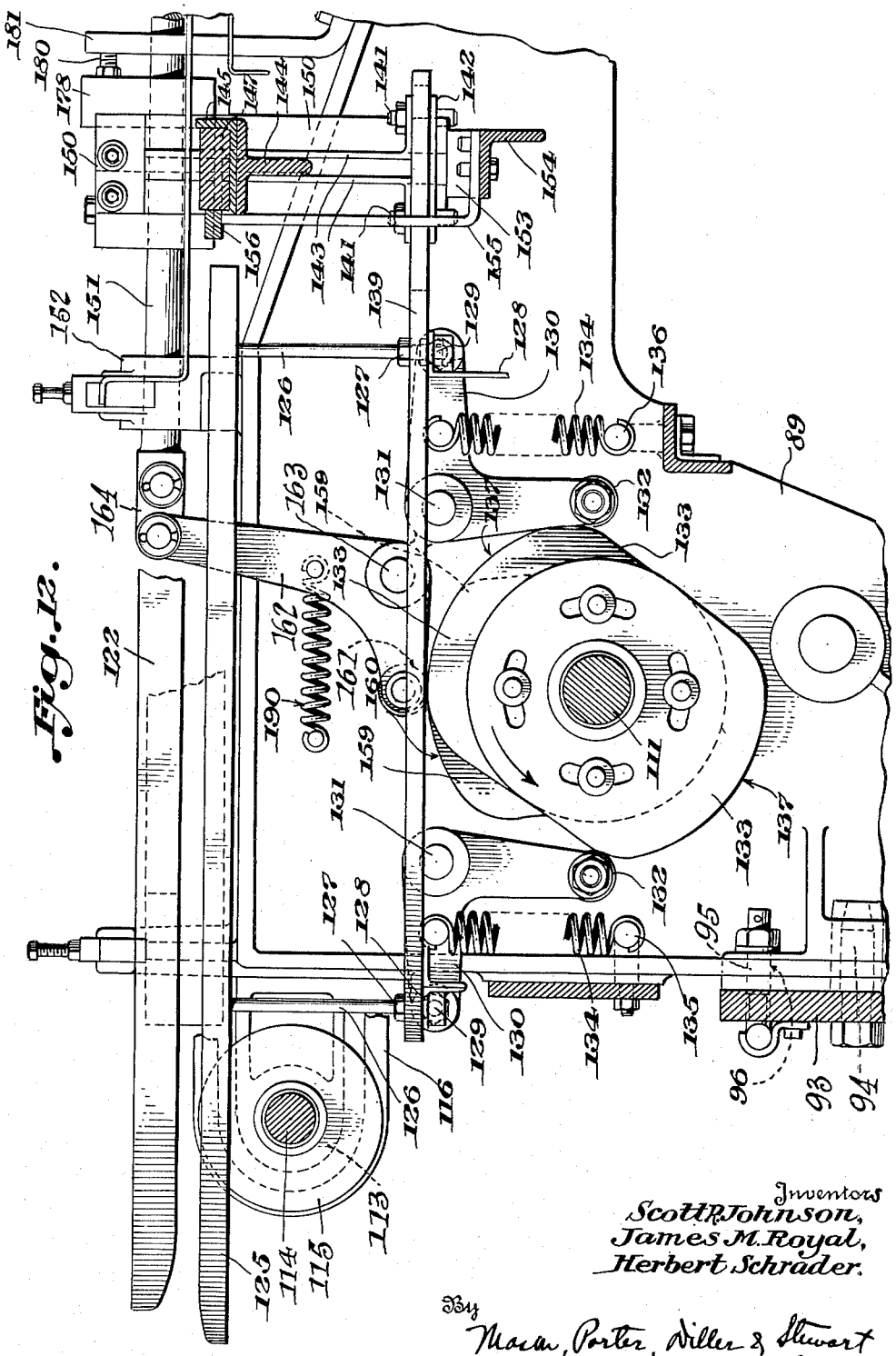

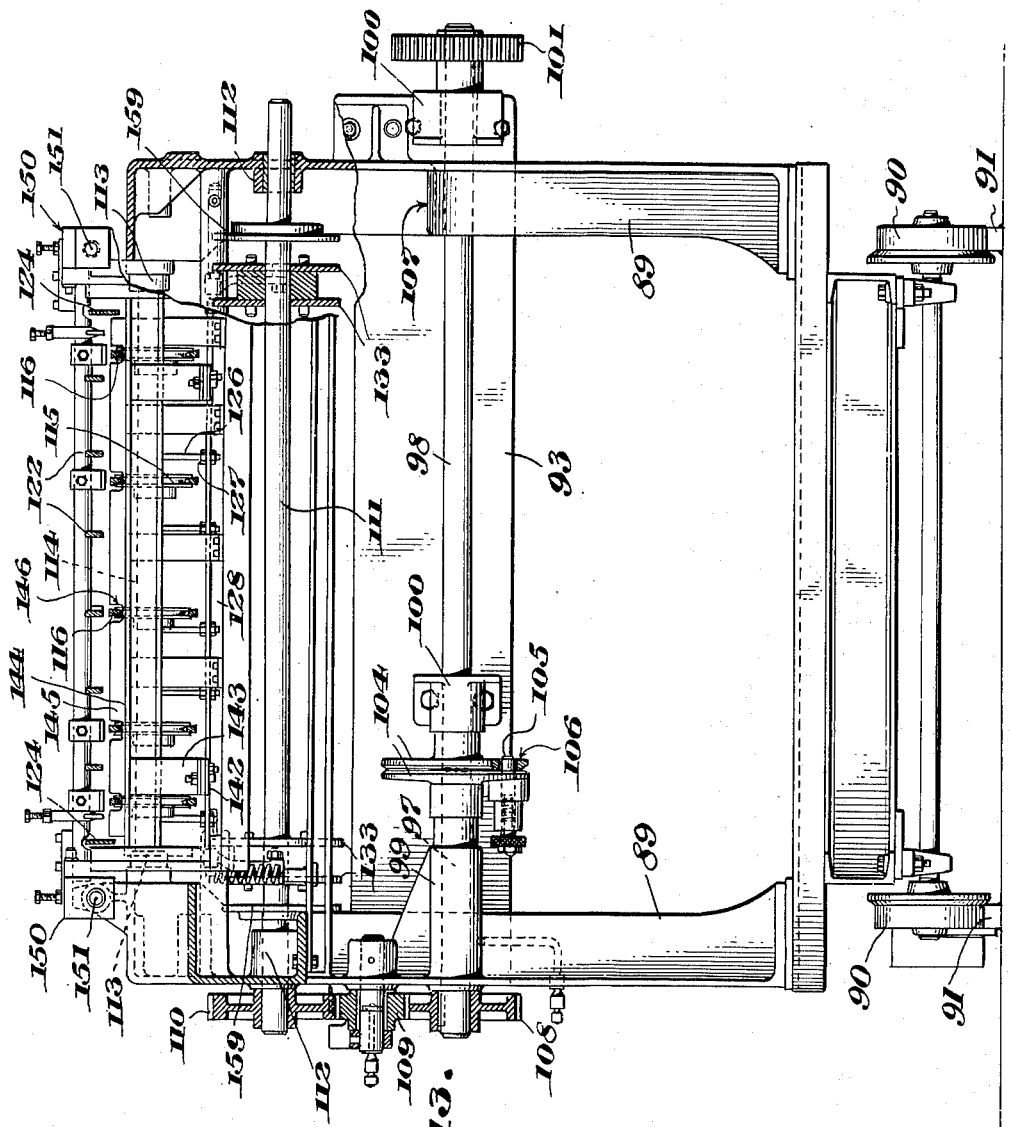

Dec. 30, 1952 S. R. JOHNSON ET AL 2,623,590
APPARATUS FOR CUTTING SCROLLED SHEETS
FROM CONTINUOUSLY FED METAL STRIPS
Filed July 11, 1947 11 Sheets-Sheet 11
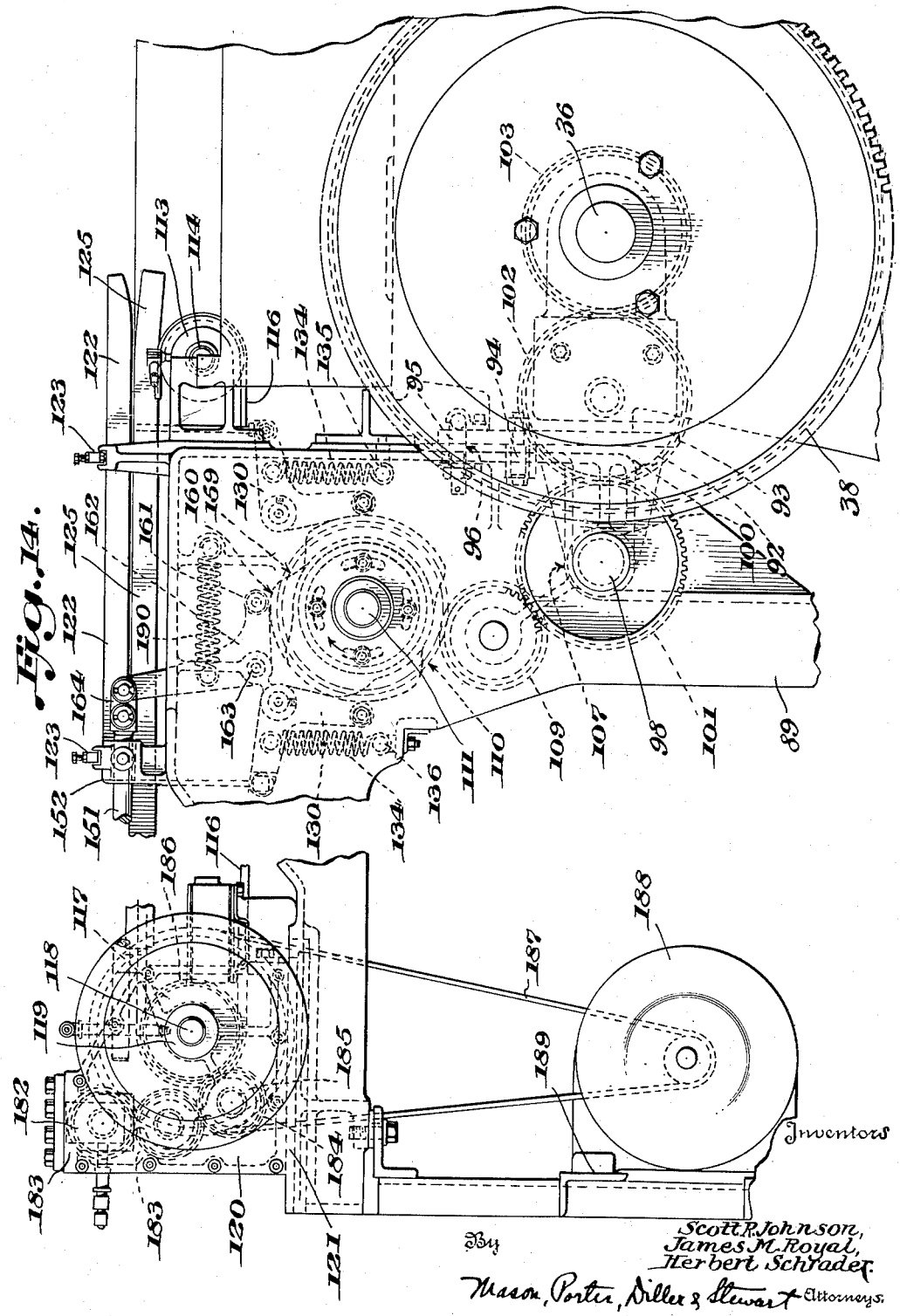
Inventors
Scott R. Johnson,
James M. Royal,
Herbert Schrader.
By Mason, Porter, Diller & Stewart Attorneys.

Patented Dec. 30, 1952

2,623,590

UNITED STATES PATENT OFFICE 2,623,590

APPARATUS FOR CUTTING SCROLLED SHEETS FROM CONTINUOUSLY FED METAL STRIPS

Scott R. Johnson, River Forest, and James M. Royal and Herbert Schrader, Chicago, Ill., assignors to Continental Can Company, Inc., New York, N. Y., a corporation of New York Application July 11, 1947, Serial No. 760,408

26 Claims. (Cl. 164—49)

The invention relates generally to the art of cutting sheets and primarily seeks to provide novel means for rapidly and accurately cutting scrolled sheets from continuously fed metal strip such as rolled steel tin strip.

It is quite common in the can making art to successively feed individual scroll strips to a punch press for cutting can ends from the strips and properly die shaping the same. When strips having parallel line side edges and continuous end edges bearing right angular relation to said side edges are used much unnecessary wastage of metal is occasioned because of the straight side and end edges, particularly when the ends are punched from the strips in longitudinally and transversely aligned rows. In order to reduce this wastage of metal between punch rows, the punching of the ends has been performed by punches so placed as to stagger the rows so that each punch hole in a given row is centered between two hole centers in an adjacent row thereby to permit the row centers to be brought closer together, but with this arrangement one opening at the end of each row is spaced a considerable distance from the adjacent end edge of the strip and unnecessary wastage is occasioned at said ends unless some provision is made to avoid the same. It has been found that by cutting coil stock transversely at sheet lengths by a scroll cutter, scrolled sheets can be formed which can be turned 90° and fed step by step through scroll shears for having scroll cuts made transversely thereacross so as to divide said sheets into multiples of scroll strips in which most of the wastage referred to will be eliminated in the subsequent cutting of end closures therefrom. According to this practice it has been found practical to so closely place the punch cuts as to provide scrap in which the punch holes are spaced as little as .035 of an inch apart, and a .060 of an inch spacing of the punch cuts is quite common. It will thus be apparent that the scroll sheets must be cut from the continuously fed metal strip with great accuracy.

It has been proposed heretofore to continuously feed metal strip by use of suitable feeding means such as leveler rolls, and to automatically cut the continuously travelling strip into sheet lengths, as by use of flying shears or comparable cutting devices designed to travel with the strip during the actual cutting operation. Such apparatus has been found somewhat objectionable in use because of the lack of accuracy and uniformity in the cutting of the sheet lengths, and it was also found that the moving cutting devices tended to drag the strip through the leveler rolls during each cutting function in a manner for objectionably marring the surface of the strip. Moreover no such apparatus of which we are aware has been adaptable for the cutting of scrolled sheets.

It has been proposed also to effect the cutting of sheet lengths from continuously fed metal strip by engaging the strip end with gage stop means and cutting the gaged sheet lengths by stationarily mounted, reciprocating shears. It being necessary for the continuously fed strip to remain stationary at the cutting station during the cutting of each sheet length therefrom, a slack hump or loop would form between the continuous feeding devices and the shears during the making of each cut, and it was found difficult, because of variations in strip surface and thickness, to control the feeding of the strip so as to assure the intermittent formation of a slack hump always within the proper operating range, and to so accurately gage the strip preparatory to cutting as to adapt such apparatus for the cutting of scrolled sheets.

A novel apparatus for controlling the feeding of metal strip to stationarily mounted, reciprocating shears or the like in a manner for assuring the intermittent formation of a slack hump always within the proper operating range is disclosed and covered in the copending application for U. S. Letters Patent filed July 11, 1947, by Justin Simpson and identified by Serial Number 760,338, and which has matured as Patent 2,480,781, dated August 30, 1949, and it is the purpose of the present invention to provide a novel combination of means for continuously feeding the metal strip, gage stop means and reciprocable scroll shear means capable of cutting scrolled sheets rapidly and in a uniformly accurate manner.

An object of the invention is to provide scrolled sheet cutting apparatus of the character stated in which are included stop devices reciprocable upwardly and downwardly, into effective position for intercepting and accurately gaging the strip end a definite distance from the scroll shear, and out of said effective position for permitting the cut sheets to be conveyed past the stop devices, said stop devices also being so constructed and arranged as to be engageable with the scrolled end of the strip in a manner for accurately positioning the strip end widthwise as well as endwise.

Another object of the invention is to provide scrolled sheet cutting apparatus of the character stated in which novel means is provided for clamping the strip in position adjacent the shearing means while the shearing operation is in progress, and also novel means for side edge gaging and accurately positioning the strip adjacent said shearing means prior to each clamping and cutting of the strip.

Another object of the invention is to provide scrolled sheet cutting apparatus of the character stated in which the strip in passing the shearing means and coming against the gage stop moves onto and over supporting rails which are movable upwardly and downwardly with the gage stops in timed relation with the shearing means so that the strip end, after being received on the rails and gaged and clamped and before being cut, is lowered by said rails onto feed belts which operate to move the cut sheet away over the depressed gage stops as soon as the sheet is severed from the strip by the shearing means.

Another object of the invention is to provide scrolled sheet cutting apparatus of the character stated in which means is provided for causing the gage stops to move a distance with the strip end as it is coming into gaging contact therewith, thereby to prevent harsh impacting of the strip end against the gage stops during the gaging function and enable more rapid operation of the apparatus than would otherwise be possible.

Another object of the invention is to provide in combination with the scrolled strip end engaging gage stops, novel stripping devices which at least in part follow the strip end engaging contour of said stops and are fixedly supported at such a level as to prevent the dragging of any portion of the sheet end any substantial distance below the level of the feed belts as the gage stops are moved downwardly.

Another object of the invention is to provide a strip gaging arrangement of the character stated in which the gage stops are movable upwardly and downwardly with the supporting rails but are movable back and forth in the direction of the length of the strip independently of said rails.

Another object of the invention is to provide scrolled sheet cutting apparatus of the character stated in which the strip is fed against the gage stops by the continuous feed means, and in which there is included roll means disposed beyond the slack hump formed in the strip incidental to the continued feeding of the strip while the shear cutting is in progress, said roll means being operable in timed relation to the gage stops, the strip clamping means and the shearing means to impart a feeding movement to the strip of limited duration sufficient only to initiate the running out of the slack hump preparatory to the final feeding of the strip end against the stops by said continuous feed means after the clamping means and shear have moved out of contact with said strip.

Another object of the invention is to provide in apparatus of the character described, clamp means for securely clamping the strip preparatory to operation of the shearing means, a continuously driven roll disposed adjacent the clamp means and engageable by the metal strip, an idler roll opposed to the driven roll at the opposite face of the strip, a cam shaft, carriers for said idler roll, carriers for said clamp means, spring means constantly urging the idler roll and clamp means toward the strip, and cam means on said shaft for controlling the positions of the carriers to move the idler roll away from the strip and permit the clamp means to move into clamping engagement therewith preparatory to a sheet cutting operation, and to move the clamp means away from the strip and permit the idler roll to move into contact with the strip for a limited interval following a sheet cutting operation thereby to press the strip against the driven roll and impart a feeding movement to the strip for initiating the running out of the accumulated slack hump.

With the above and other objects in view that will hereinafter appear, the nature of the invention will be more clearly understood by reference to the following detailed description, the appended claims, and the several views illustrated in the accompanying drawings.

In the drawings:

Figure 5 is an enlarged fragmentary vertical longitudinal section taken through one of the idler roll mountings.

Figure 6 is a fragmentary plan view illustrating the shearing table, the strip supporting rails, and the feed-away belts, parts being broken away and shown in horizontal section.

Figure 7 is a fragmentary plan view illustrating the means for laterally gaging the strip at the shearing station.

Figure 8 is a detail perspective view illustrating the mounting of the movable side gage.

Figure 11 is a detail vertical cross section illustrating one trunnion mounting of the lower rail lifting frame.

Figure 12 is an enlarged fragmentary vertical longitudinal section showing the movable stop gage actuating devices.

Figure 13 is a vertical cross section taken across the machine at the position of the gage stops and looking rearwardly toward the shearing station.

Figure 14 is an enlarged fragmentary left side elevation of that portion of the machine extending from the shearing station to the end of the machine at which the cut sheets are discharged, parts being broken away.

Figure 1:
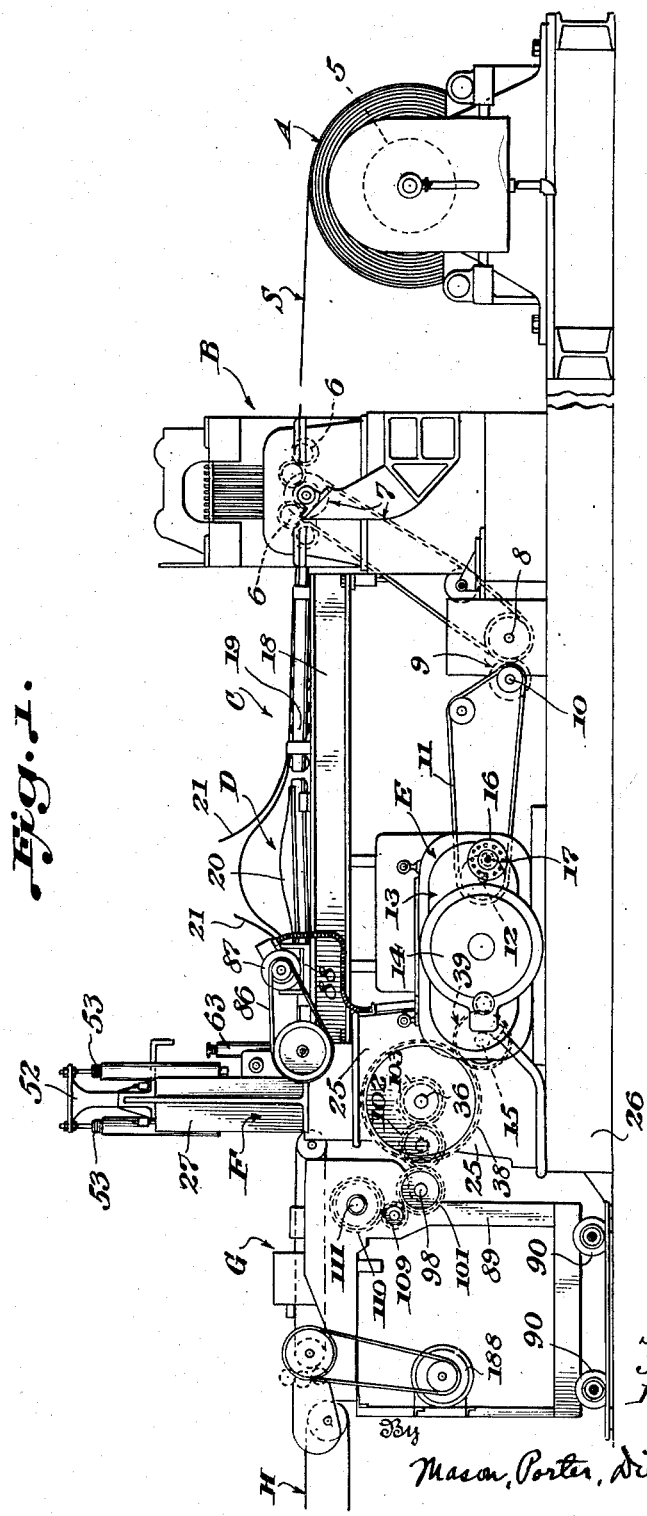
Figure 1 is a left side elevation of a machine structure embodying the invention.

It will be apparent by reference to Figure 1 that in the machine illustrated herein, as an example of embodiment of the invention, there are included a coil or supply roll A of rolled steel tin strip from which the strip S is fed by suitable continuously operating feed means such as the leveler roll unit generally designated B. The strip is fed over a feed table C including an upwardly convex hump former portion D through the medium of the leveler rolls which are driven by drive means generally designated E. After passing over the feed table C, the strip S passes through a shearing station generally designated F onto and over a gaging table generally designated G, and while on the gaging table the strip is accurately gaged endwise and widthwise at its free end, and said strip is also accurately gaged widthwise by side gaging means disposed adjacent the shearing means at the shearing station. The accurately gaged strip end fed beyond the shearing means at the shearing station F is severed to form a scrolled sheet by operation of the shearing means in a manner to be described hereinafter, and the cut sheets are fed from the gaging table G onto feed-away conveyor means generally designated H and which may serve to feed the sheets to a stacker or elsewhere.

It is to be understood that the strip S in passing from the coil A to the leveler roll unit B may pass through an edge slitter effective to trim the lateral edge of the strip, in the well known manner, but for purpose of simplicity of illustration, this unit is not shown.

The coil A is supported on an arbor 5 preferably equipped with braking means (not shown), and the strip S is drawn off the coil by the coacting leveler rolls 6 of the unit B, said rolls having suitable driving connections and having rotation imparted thereto by sprocket and chain driving connections 7 from a driver shaft 8. The shaft 8 is driven through a gear couple 9 from a shaft 10 which is in turn driven by sprocket and chain connections 11 from a power output shaft 12 of the Reeves drive generally designated 13. Reeves drives of the type illustrated are well known and examples of such drives are to be found in U. S. Letters Patents to Heyer 2,078,196 of April 20, 1937 and Keller 2,266,687 of December 16, 1941. The drive generally designated 13 includes a motor 14 which is effective through intermediate connections to drive the power output shaft 12 and also a power output shaft 15, the shaft 12 being driven at variable speeds in the well known manner by selectively turning the adjuster wheel 16 on the adjuster shaft 17.

The shearing means to be described hereinafter operates intermittently, and the leveler rolls are driven continuously, and it will therefore be apparent that during each shearing operation the strip S will be held stationary at the shearing station F, and during this interval a slack hump will form over the feed table C between the leveler rolls and said shearing station. In the practical development of the machine, means is provided for automatically adjusting the adjuster wheel 16 so as to maintain the slack hump within a proper operating range. This automatic control means is not disclosed herein because it forms no part of the invention claimed herein, said control means being disclosed and covered in the copending application for U. S. Letters Patent filed by Justin Simpson on July 11, 1947, and identified by Serial No. 760,338.

Figure 4:
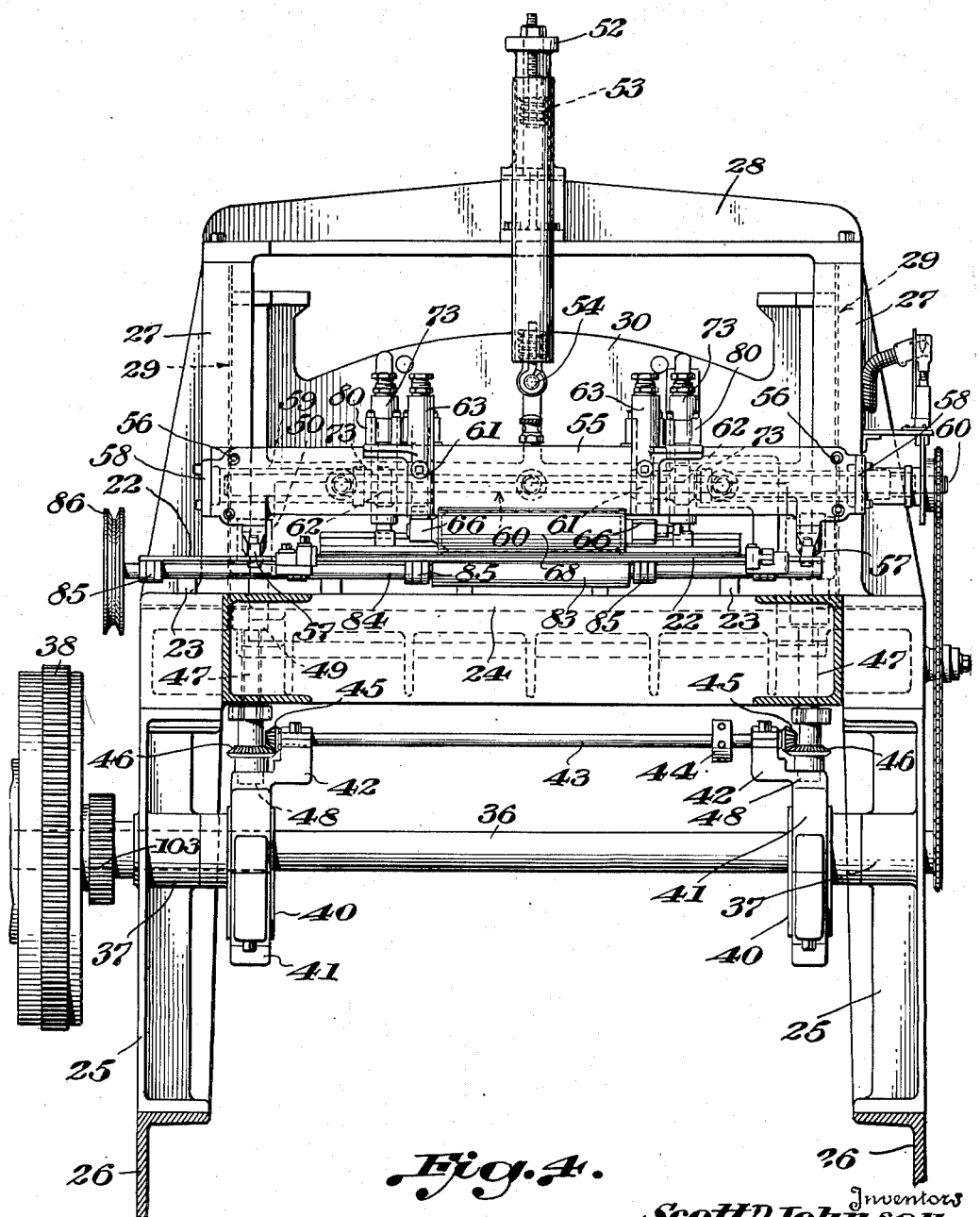
Figure 4 is a vertical cross section at the position of the shearing station and looking in the direction in which the strip is fed.

The feed table C includes a frame structure 18, a rollway 19 over which the strip S is fed, an upwardly convex hump starter 20 disposed about half-way between the leveler roll unit B and the shearing station F, and hump confining guards 21 which serve to prevent uncontrolled upward flexing of the strip and to place the slack hump properly with relation to the automatic control devices referred to hereinabove. By reference to Figures 1, 2 and 4 of the drawings, it will be apparent that the strip S is fed from the feed table C over a table 22 disposed at the shearing station. The table 22 is supported as at 23 on a transverse bed or frame member 24 which is mounted at its ends on side pedestals 25 arising from the frame base 26. Guide standards 27 are secured on and extend upwardly from the bed 24, and a transverse head piece 28 is secured across the tops of the standards 27 in the manner best illustrated in Figure 4.

The guide standards 27 are provided with vertical guideways 29 in which a cross head 30 is vertically slidable. The cross head has a scroll shear 31 secured thereon in position for cooperating with a scroll die 32 which is secured as at 33 upon the bed 24, said shear and die being provided with cooperating scroll cutting edges 34, the contour of which is best illustrated in Figure 6. It will also be apparent by reference to Figures 2 and 3 of the drawings that the scroll shear 31 is equipped with a spring depressed stripper plate 35 which is normally held a slight distance below the cutting edge of the scroll shear by the depressing springs so as to engage with the strip over the die 32 during each shearing action. The stripper plate holds the strip against the die as the shear rises after each cutting action so as to strip the end of the strip from the shear in the well known manner and prevent said strip end from following the shear in its upward travel.

A shear driving shaft 36 is mounted in bearings 37 in the pedestals 25 beneath the bed 24, and a large gear 38 is secured on one end of said shaft. Rotation is imparted to said gear and shaft by a driver gear 39 which is secured on the power output shaft 15. The shaft 36 has two eccentrics 40 secured thereon, and each eccentric is surrounded by a strap 41. Each strap 41 is provided with a bearing extension 42, and a transversely disposed adjuster shaft 43 is rotatably mounted in the two bearing extensions 42. The adjuster shaft has a capstan 44 secured thereon intermediate the ends thereof, and a bevel pinion 45 is secured upon each end of said shaft. Each bevel pinion 45 meshes with a bevel gear 46 secured on an uprightly disposed adjustable pitman screw 47 having step bearing as at 48 in the respective bearing extension 42 and which is threaded into the lower hub portion 49 of a bifurcated connector member 50 which is pivotally connected as at 51 with the cross head 30.

It will be apparent from the foregoing that the rotary motion of the shaft 36 will be transmitted through the adjustable pitmans 47 in the form of vertical reciprocatory movement to the cross head 30 and the scroll shear 31 secured thereon. By turning the adjuster shaft 43, accurate up and down adjustments of the scroll shear can be made.

A bracket 52 is secured to and extends upwardly from the head piece 28, and suspension springs 53 are secured to and depend from said bracket and have their lower ends connected as at 54 to the cross head 30 in a manner for counterbalancing the weight of said cross head and the attached scroll shear 31. See Figures 1 and 4.

A transverse housing member 55 is secured as at 56 to the rear faces of the standards 27, and said housing is also secured upon the table 22 as at 57. See Figures 2, 3 and 4. The housing is provided with removable end caps 58 equipped with bearings 59 in which a cam shaft 60 is rotatably mounted. The cam shaft 60 is equipped with two roll lifter cams 61 and two clamp lifter cams 62, the purpose of which will become apparent as the description progresses. Two roll support guides 63 project from the rear face of the housing 55, and in each of said guides a roll supporting plunger 64 is vertically slidable, each said plunger being constantly urged downwardly by a compression spring 65 interposed between the upper end of the plunger and a removable closure cap on the guide in the manner best illustrated in Figure 5. The plungers 64 have bearings 66 at their lower ends in which are rotatably mounted the trunnions 67 of an idler roll 68. The plungers also have slots 69 extending therethrough into which extend the free ends of lifter levers 70 which are pivoted at 71 to ears projecting from the front side of the housing 55. As before stated, the springs 65 constantly tend to depress the idler roll 68, and the levers 70 are moved upwardly to lift the idler roll at the proper time by tappets 72 disposed intermediately of the length of the levers in position for engaging the upper surfaces of the roll lifter cams 61 in the manner clearly illustrated in Figures 2 and 3 of the drawings.

The transverse housing member 55 also is provided with two clamp support guides 73 projecting from the front face thereof, and in each guide 73 is mounted a clamp supporting plunger 74. The plungers 74 are vertically slidable in the guides 73 and are constantly urged downward by compression springs 75 interposed between the upper ends of said plungers and closure caps removably secured to the upper ends of the guides. The plungers 74 are attached at their lower ends as at 76 to a clamp bar 77 which is disposed transversely over the table 22 immediately in advance of the stationary scroll die 32. The plungers 74 also have slots 78 therein into which extend the free ends of lifter levers 79 which are pivoted as at 80 to ears projecting from the rear side of the housing 55. The compression springs 75 constantly tend to press the clamp bar 77 against the strip S on the table 22, and the clamp bar is lifted at proper times by tappets 81 disposed intermediately of the ends of the clamp lifter levers 79 in position for engaging the upper surfaces of the clamp lifting cams 62.

Directly beneath the idler roll 68 and having its periphery projecting upwardly through a transverse slot 82 in table 22 is a strip feeder roll 83. The roll 83 is secured on a cross shaft 84 and is rotatable in bearings 85 depending from the table 22. The shaft 84 is continuously driven through pulley and belt transmission connections 86 from the motor 87 which is supported as at 88 on the machine frame.

Figure 2:
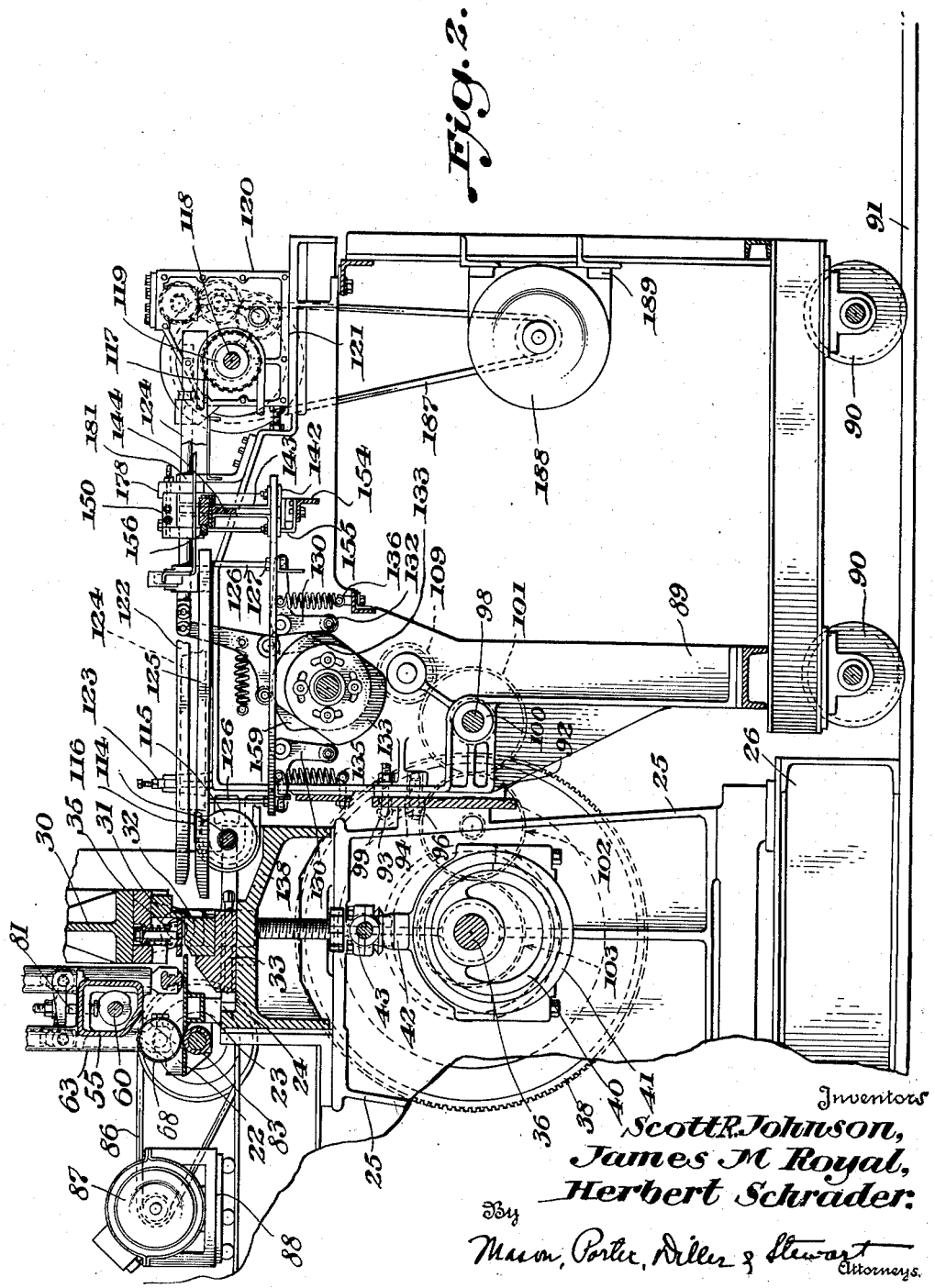
Figure 2 is an enlarged fragmentary longitudinal section illustrating that portion of the machine at and just beyond the shearing station, the condition of the parts just after the completion of a sheet cutting operation being shown.

By reference to Figures 1, 2 and 13 of the drawings it will be apparent that the gaging table G is in the form of a unit which is readily separable from the machine at the shearing station so that all machine parts at the shearing station may be readily accessible for adjustment, repair or replacement, without interference by the gaging devices and the strip feeding, supporting and conveying means associated therewith. For this purpose the gaging table includes a frame structure generally designated 89 and including a base portion equipped with wheels 90 which are rollable over longitudinally placed tracks 91. In order to assure accurate placement of the gaging unit with relation to the shearing means, the frame structure 89 includes abutment means 92 which is engageable with an abutment plate 93 secured across the front end of the pedestals 25. The plate 93 carries locator pins 94 which are engageable in sockets in the abutment means, and securing bolts 95 pivoted on the abutment plate 93 are receivable in slots 96 in the abutment means 92 for securing the gaging unit in place against any tendency to creep over the tracks 91.

A cross shaft composed of two axially aligned sections 97 and 98 is provided, one section 97 being rotatably mounted in a bearing 99 provided on the movable gaging frame structure 89, and the other section being rotatably mounted in bearings 100 attached to the fixed main frame. The shaft section 98 has a spur gear 101 secured thereon in position for meshing with and being driven by an idler gear 102 which is rotatably mounted on one of the pedestals 25 and driven by a gear 103 mounted on the shear driving shaft 36. The shaft sections 97 and 98 have coupling disks 104—104 secured on their adjacent ends, one thereof having a spring pin 105 adapted to enter a single receiving recess 106 in the other disk. It will be obvious that whenever the frame structure 89 is accurately coupled to the main machine frame pedestals in the manner illustrated in Figures 2, 3 and 14 of the drawings, the shaft sections 97 and 98 also being coupled by the disks 104 as shown in Figure 13, rotation will be imparted to the coupled shaft sections through the gear couple 103, 102, 101 from the shaft 36. When it is desired to move the gaging table G away from the main frame the bolts 95 are released and the shaft section coupling pin 105 is removed from the recess 106 to free the gaging table frame and allow the shaft section 97 mounted thereon to move away from the shaft section 98 mounted on the main frame. Thus the gaging table can be moved away without disturbing the gear couple 103, 102, 101 and the frame 89 is provided with a shaft section clearing offset 107 to facilitate this movement away of the gaging table unit. When the gaging table unit is rolled back and recoupled in its operative position by attachment of the bolts 95, the recoupling of the disks 104 by insertion of the pin 105 in the single recess 106 assures proper restoration of the timing of the parts driven through the shaft sections 97 and 98.

A gear 108 is secured on the shaft section 97 and drives an idler gear 109 which is mounted on the frame structure 89, said idler gear in turn driving a gear 110 which is secured on a transversely disposed cam shaft 111 rotatable in frame bearings 112. See Figures 2, 6 and 13. The purpose of the cam shaft will become apparent as this description progresses.

In bearings 113 attached to the frame structure 89 there is mounted an idler shaft 114, and it will be apparent by reference to Figures 2, 6 and 13 of the drawings that a plurality of pulleys 115 are mounted on said shaft in transversely spaced relation. Conveyor belts 116 pass forwardly over the idler pulleys 115 and about driver pulleys 117 secured on a cross shaft 118 which is rotatably mounted in bearings 119 on the frame structure at the front end of the machine. It will be noted that the upper surfaces of the top flights of the belts are disposed in a plane slightly below the level of the top surfaces of the table 22 and the stationary die 32. See Figures 2 and 3. The bearings 119 for the shaft 118 are formed on bearing members 120 which are longitudinally-adjustably mounted as at 121 on the frame structure 89.

A plurality of longitudinally extending top rails 122 are fixedly supported as at 123 on the frame structure with the lower edges thereof disposed in a common horizontal plane spaced above the top surfaces of the belts 116 and approximately at the level of the strip S passing over the table 22 and the stationary die 32. Two side guide rails 124 also are fixedly mounted on the frame structure in position for confining the strip S at its lateral edges.

A plurality of longitudinally extending, vertically movable strip supporting rails 125 also are provided, certain of said rails being disposed directly beneath certain of the previously mentioned top rails 122. Each rail 125 is secured to the top ends of two support rods 126 which are fixed at their lower ends as at 127 to two transversely disposed angle irons 128 each having trunnion bearing as at 129 at its ends in the free ends of the generally horizontally disposed arms of a pair of bell crank levers 130. The bell crank levers of each pair are pivotally supported as at 131 on the frame structure 89 and have the lower ends of their generally vertically depending arms equipped with rollers 132 which are engaged by rail lifting and lowering cams 133 mounted on the cam shaft 111 in the manner clearly illustrated in Figures 2, 3, 6, 13 and 14. It will be noted that two of the cams 133 are disposed in parallel spaced relation adjacent each end of the cam shaft 111 for engagement with the bell crank levers 130 at the particular side of the machine. The bell crank levers are held against the cams by retractile springs 134 which are anchored as at 135 and 136 on the frame structure, and it will be noted that each cam 133 has a rail lifter crest 137 having a concentric dwell portion extending approximately 90° about its circumference, and the crests of the cam pairs at each end of the shaft 111 are diametrically oppositely disposed so as to properly engage with the two sets of transversely aligned pairs of bell crank levers 130.

Figure 3:
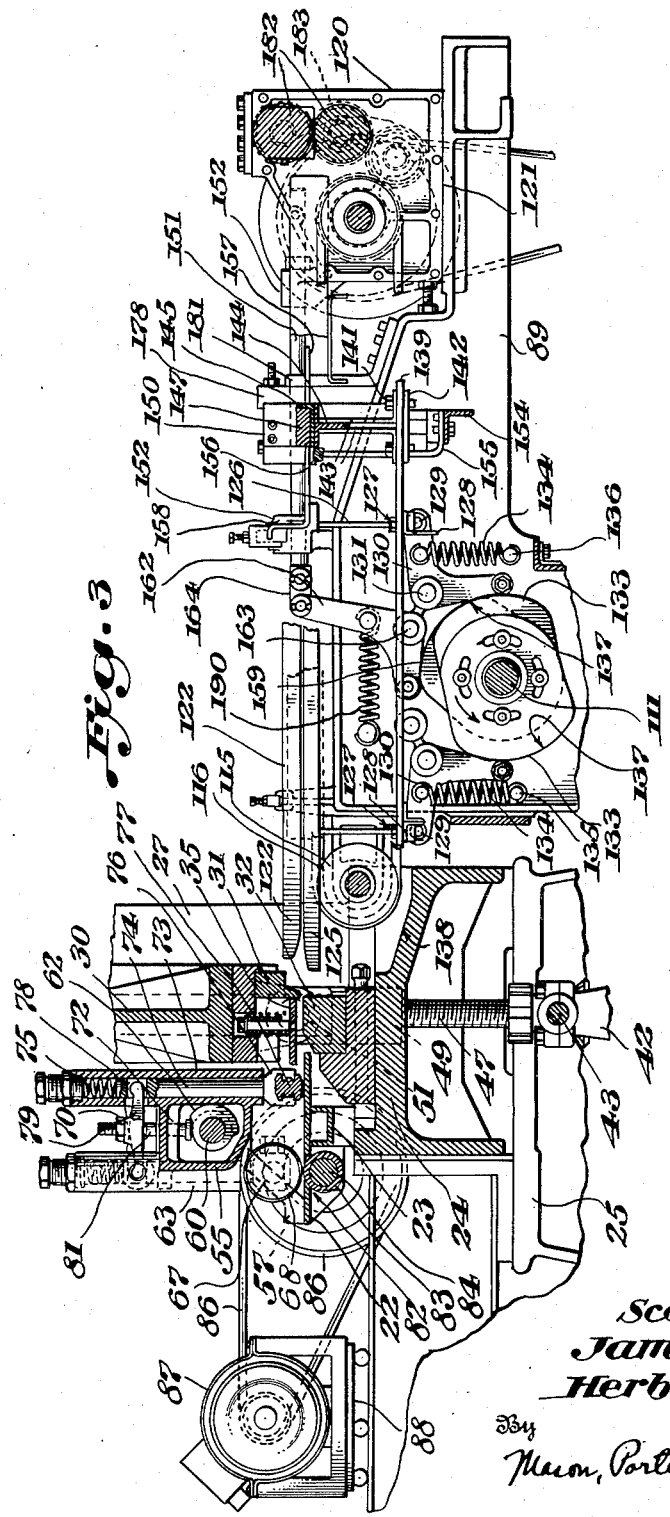
Figure 3 is a view similar to Figure 2, on a larger scale, and illustrating the condition of the parts when the strip is in contact with the gage stops in their position of full recession.

Attention is directed to Figures 2 and 3 of the drawings from which it will be noted that the frame bed 24 at the shearing station is provided with a clearance 138 into which the pulleys 115 and the rear ends of the rails 122 and 125 of the gaging table unit may extend when said unit is operatively coupled in the position illustrated in said figures, thereby to permit said parts to be placed closely adjacent the shearing means.

Two longitudinal bars 139 are placed over the transverse angle irons 128 and are secured thereon as at 140. The bars extend forwardly beyond the foremost angle iron 128 where each is longitudinally slotted to receive the bolts 141 which slidably secure underlying slide plates 142 and the overlying, horizontally turned feet of bracket members 143 to said extended bar ends. Between the upper ends of the bracket members 143 the vertically disposed web of a T-bar 144 is secured. Secured across the top of the transversely disposed T-bar 144 is an angle member 145, the upstanding flange of which is suitably cut away as at 146 to permit free passage of the upper flights of the conveyor belts 116. It will be noted by reference to Figures 2, 3 and 6 of the drawings that a plurality of gage stops 147 are secured on the angle member 145 and the underlying T-bar 144, and said stops provide a simulated scroll abutment stop face, or in other words are shaped as at 148 to conform to scroll cut edge portions of the end extremity of the strip S which is fed against said gage stops, thereby to serve as means for accurately placing the strip end with relation to the shearing means and to accurately gage said strip end both endwise and widthwise. The side guide rails 124 serve to guide the strip S toward the gage stops 147 with sufficient accuracy to cause the scroll cut end edge portion to engage properly with the scroll shaped portions 148 of the gage stops to be accurately gaged thereby.

The T-bar 144 is slidably mounted at each end in a vertical guideway 149 formed in a bracket 150 which is secured on a slide rod 151 slidably mounted in guides 152 provided on the frame structure. Each bracket has a block 153 secured to its lower end, and a transverse angle iron 154 is secured across said blocks. Bracket pieces 155 are secured to the angle iron 154, and upright portions of said pieces carry strippers 156 which conform at least in part to the scroll shaped gage stops and lie against the rear faces thereof in the manner clearly illustrated in Figures 2, 3 and 6 of the drawings.

Intermediate strip depressers 157 are rigidly mounted as at 158 on one of the top rail supports, and said depressers overlie the belts 116 at the position of the gage stops so as to prevent jumping of the free end of the strip over said stops as the strip comes into gaging contact therewith.

A gage travel imparting cam 159 is mounted on each end of the cam shaft 111, and each said cam is provided with a crest 160 including a concentric dwell portion extending about approximately 90° of the circumference of the cam. Each said cam is engageable with a roller 161 secured on the free end of the generally horizontally disposed arm of a bell crank lever 162 which is pivoted as at 163 on the frame structure. Each bell crank lever includes a generally vertically extending arm which is link connected as at 164 with one of the previously mentioned slide rods 151, and it will be apparent that the bell crank and link connections with the cams 159 serve to transmit the rotary motion of the cam shaft 111 in the form of reciprocatory movement to the brackets 150 and the gaging and stripping devices 147, 156 connected therewith.

The cam and lever devices 159, 162 are so constructed and arranged and timed with relation to the gage lifting and lowering devices and the shearing devices that the gage stops will be moved upwardly into position, intercepting the oncoming free end of the strip S as it moves through the shearing station to be gaged preparatory to the making of a scroll shear cut, and while intercepting and gage stopping said strip end will move endwise therewith so as to minimize the shock incidental to the gaging operation. After the gage stopping of the strip end is completed, the gage stops will be lowered and then returned to their initial position preparatory to the next gage stopping function. As the gage stops are lowered, the stripper members 156 remain at their fixed level and prevent the dragging of the free end of the strip downwardly by the gage stops below the level of the top surface of the conveyor belts 116.

As previously stated, means also is provided for laterally gaging the strip adjacent the shearing means prior to the cutting of each sheet length from said strip. This means comprises a side gage 165 secured to the frame structure in position for engaging one side edge of the strip adjacent the shearing station in the manner illustrated in Figure 7 of the drawings. The strip is engageable at the other side edge by a movable gage 166 which is pivotally supported as at 167 on the frame and includes a crank extension 168. The crank extension is pivotally connected as at 169 with an actuator rod 170 which is slidable in bearings 171 supported on the frame and is equipped at its free end with a roller 172. The roller is engageable by a wedge cam 173 which is movable upwardly and downwardly with the scroll shear 31. A compression spring 174 interposed between one of the bearings 171 and an abutment 175 secured on the rod 170 constantly urges the rod in a direction for displacing the gage 166 out of its strip edge engaging position. A stop 176 secured on the rod 170 and engageable with the other bearing 171 is effective to limit the movement of the rod in the gage displacing direction in a manner for placing the roller 172 in position for being properly engaged by the wedge cam plate 173 as it descends with the scroll shear 31 during each shearing operation. In this manner the descending wedge cam plate 173 engages the roller 172 and moves the movable gage just prior to each scroll shearing action so as to cause the eccentrically curved face 177 of the movable gage to contact with the adjacent side edge of the strip and force the strip into proper gaging contact with the fixed gage member 165. The eccentric gaging face 177 of the movable gage member 166 is so placed that it will be moved out of contact with the adjacent edge of the strip each time the scroll shear 31 ascends and moves the wedge cam plate 173 out of effective contact with the rod roller 172.

In order to assure that the gage stops 147 shall be accurately placed as the end of the strip S moves against them during the gaging of the strips, a stop block 178 is slidably mounted on each rod 151 and is accurately placed with relation to the respective bracket 150 by abutment nuts 179 abutting opposite faces of the block and threadable along an adjuster screw 180 which is fixed to said bracket and passes through a smooth bore in said block. As the gage stops 147 complete their movement of recession with the end of the strip S being gaged, the blocks 178 come against stop members 181 which project upwardly from the gaging table unit frame and are bifurcated at their upper ends so as to straddle the rods 151.

By reference to Figures 2, 3 and 14 of the drawings it will be noted that the adjustably mounted bearing members 120 rotatably support a pair of feed-out pinch rolls 182 which are disposed at a level for receiving the scroll cut sheets as they are moved over the delivery ends of the conveyor belts 116. The pinch rolls are gear coupled as at 183 and are driven, through an idler gear 184 supported as at 185 on one of the bearing members 120, from a driver gear 186 which is secured on the cross shaft 118 to which rotation is imparted by the pulley and belt transmission 187 from the motor 188 which is supported as at 189 on the frame structure 89.

*Operation*

The scroll shear 31 is vertically reciprocated at a constant rate, and the strip S is continuously fed toward the shearing station and the gaging devices by the leveler rolls 6. Because of the fact that the shearing operation is intermittent, a slack hump will be formed above the upwardly convex hump starter table portion 20 during each sheet cutting operation, and by properly adjusting the adjuster wheel 16 the slack hump can be kept within a proper operating range.

Figures 9, 10:
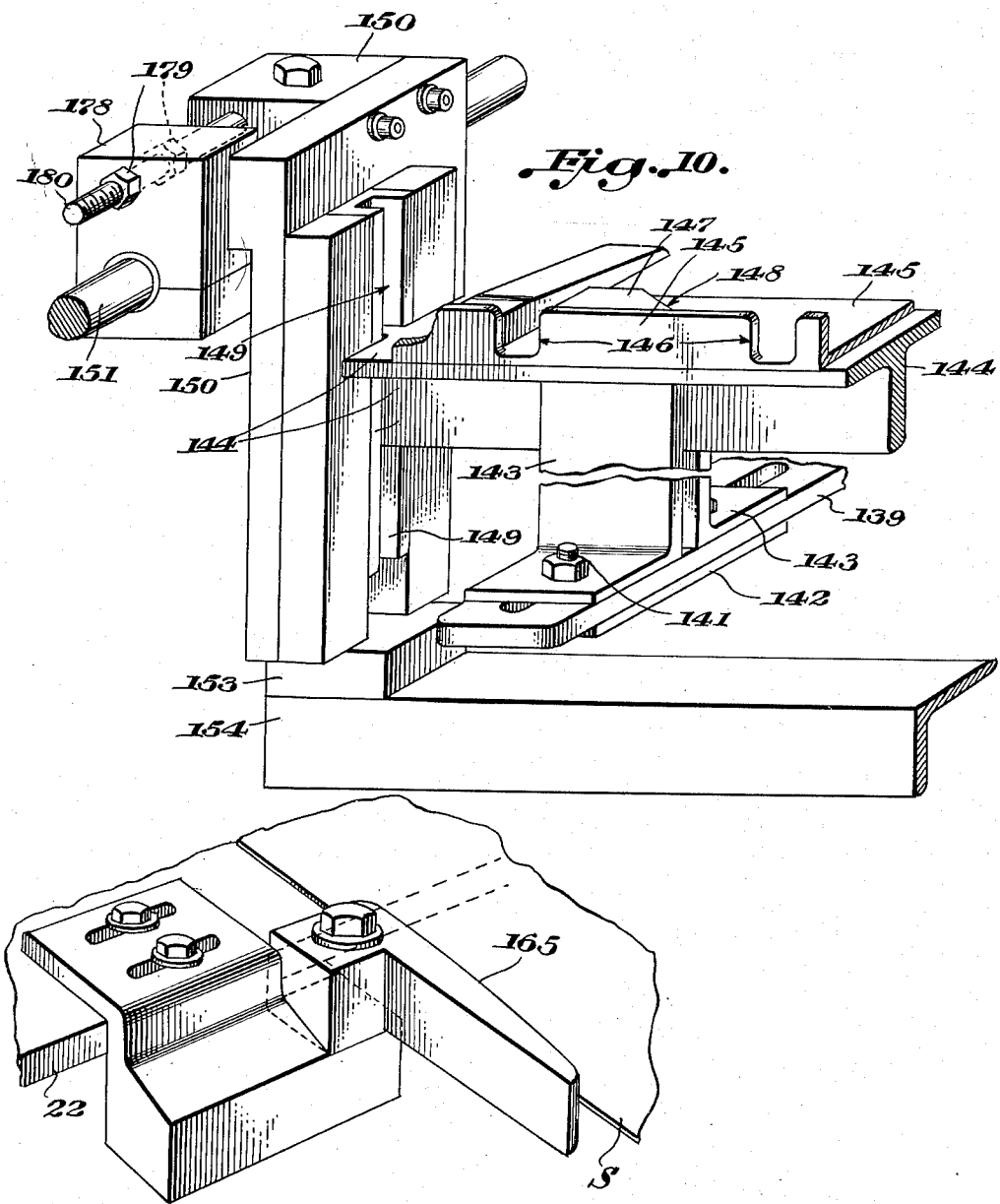
Figure 9 is a detail perspective view illustrating the mounting of the fixed side gage.
Figure 10 is a fragmentary perspective view illustrating one end portion of the movable stop gage mounting.

While the scroll shear 31 is in elevated position, the leveler rolls 6 feed the free forward end of the strip against the gage stops 147 which serve to accurately gage the free end of the strip both endwise and widthwise in the manner previously described. In effecting the accurate gaging of the distance of the free end of the strip from the shearing devices the gage stops are moved upwardly into position for intercepting said strip end and move along with said strip end during the gaging process, but at a slower speed than the strip end approaches contact with the stop so as to intercept, gradually stop and accurately gage the strip end without any objectionable shock. As the gaging of the free end of the strip is completed, the wedge cam plate 173 descending with the scroll shear engages the actuater roller 172 and moves the movable gage 166 into the gaging position shown in Figure 7 in which the eccentrically curved gaging surface 177 of the movable gage contacts the adjacent side edge of the strip and presses the strip laterally in proper gaging contact with the fixed side gage member 165. During the movement of the free end of the strip through the shearing station and into gaging contact with the gage stops 147 the movable strip supporting rails 125 are in the elevated position shown in Figures 3 and 10 of the drawings in which they receive the strip end approximately at the level of the top surfaces of the table 22 and stationary scroll die 32, the upper edges of said rails being above the level of the top surfaces of the conveyor belts 116.

At this time the clamp bar 77 and the idler roll 68 are elevated out of effective contact with the top surface of the strip S, and the feed roll 83 is turning continuously but ineffectively beneath the strip at the position of said idler roll.

After the gaging of the strip end by the gaging stops 147 and the side gages 165, 166, the clamp bar 77 is lowered to securely clamp the strip in its accurately gaged position, the idler roll 68 remaining in its elevated position, and thereafter the supporting rails 125 are lowered, the lowering movement of said rails being in progress in the illustration in Figure 2. The gage stops 147 move downwardly with the rails and the strippers 156 function to prevent the end of the strip being dragged downwardly with the gage stops below the level of the top surfaces of the conveyor belts 116. Having been thus lowered the gage stops 147 and the stripper devices 156 are returned rearwardly to the initial position which they assumed prior to their elevation into the path of movement of the strip S and their recession with the free end of said strip, this return movement of said gage and stripper devices being effected by the anchored springs 190 which hold the bell crank levers 162 against the cams 159.

With the accurately gaged strip end securely clamped by the clamp bar 77 the scroll shear 31 descends in the manner shown in Figure 2 and effects a scroll cut to sever a scroll sheet from the strip S, and as soon as the sheet is freed by the shear cut, it is rapidly moved away by the conveyor belts 116, passing freely over the gage stops 147, and then between the pinch rolls 182 onto the feed-away conveyor H.

After the scroll shear 31 and the stripper plate 35 are lifted clear of the strip, the clamp bar 77 is lifted and the idler roll 68 is immediately lowered into rolling contact with the top surface of the strip, pressing the same tightly against the continuously driven feed roll 83. At this time, the slack hump in the strip S is at its maximum height and the rolls 68 and 83 function to initiate the running out of the slack hump. The functioning of the rolls for the purposes stated eliminates the time lag that would otherwise be occasioned by relying upon gravity action to cause the slack hump to run out through the shearing station. However, the rolls 83 and 68 function only to initiate the running out of the slack hump, and as soon as this purpose is accomplished the idler roll 68 is lifted and the continuously driven roll 83 becomes ineffective to continue the feeding of the strip. Thus the leveler rolls 6 constitute the means for feeding the strip against the gage stops 147 as the strip gaging and sheet cutting cycle is repeated in the manner hereinbefore described.

In the foregoing description, the provision of the means for causing the gage stops 147 to recede as the free end of the strip S is being moved thereagainst to be accurately gaged has been stressed. This receding gage feature has been found particularly effective and desirable in the cutting of sheets at speeds in excess of 75 sheets per minute. Should it be desired to operate the shearing devices at lower speeds the feature of causing the gage stops to recede can be dispensed with and the simple up and down motion of the gage stops with the strip end supporting rails 125 will suffice to provide for the desired accurate gaging of the strip at the predetermined definite distance from the scroll shear devices. In such uses of the machine, the devices for reciprocating the rods 151 and the brackets 150 secured thereto can be dispensed with or temporarily disconnected.

While one form of the invention has been shown for purposes of illustration, it is to be clearly understood that various changes in the details of construction and arrangement of parts may be made without departing from the spirit and scope of the invention as defined in the appended claims.

We claim:

1. In apparatus for cutting sheets having scrolled ends from a continuous strip of metal, scroll shearing means, gage stop means spaced a predetermined definite distance from the shearing means and presenting a simulated scroll abutment stop face, means for bringing about movement of a strip of metal through the shearing means and endwise against the gage stop means scroll abutment face to determine the length of sheet to be cut, means for operating the shearing means to cut a sheet from the strip having a scrolled edge at each of its leading and trailing edges, said gage stop means being arranged in cooperative relation to the scroll shearing means so as to be engageable by portions of the scroll cut advance end of the strip moved endwise thereagainst in a manner for gaging the end of the strip both endwise and widthwise preparatory to the making of a scroll cut, and means for moving the gage stop means into an effective position for intercepting and stopping said strip and out of said effective position for permitting the scrolled sheet to pass beyond said gage stop means, and gage means disposed adjacent and in advance of the shearing means and engageable with the side edges of the strip as it is being sheared for accurately placing the strip at the position of the shearing means preparatory to the making of a scroll cut, said last named means including a fixed gage engageable by the strip at one side and a movable gage movable against the other side of the strip for pressing the strip against the fixed gage prior to the making of a scroll cut, and cam means attached to and movable with the shearing means for bringing about movement of the movable gage against the strip just prior to the making of a scroll cut.

2. In apparatus for cutting sheets having scrolled ends from a continuous strip of metal, scroll shearing means, gage stop means spaced a predetermined definite distance from the shearing means and presenting a simulated scroll abutment stop face, means for bringing about movement of a strip of metal through the shearing means and endwise against the gage stop means scroll abutment face to determine the length of sheet to be cut, means for operating the shearing means to cut a sheet from the strip having a scrolled edge at each of its leading and trailing edges, said gage stop means being arranged in cooperative relation to the scroll shearing means so as to be engageable by portions of the scroll cut advance end of the strip moved endwise thereagainst in a manner for gaging the end of the strip both endwise and widthwise preparatory to the making of a scroll cut, and means for moving the gage stop means into an effective position for intercepting and stopping said strip and out of said effective position for permitting the scrolled sheet to pass beyond said gage stop means, and gage means disposed adjacent and in advance of the shearing means and engageable with the side edges of the strip as it is being sheared for accurately placing the strip at the position of the shearing means preparatory to the making of a scroll cut, said last named means including a fixed gage engageable by the strip at one side and a movable gage movable against the other side of the strip for pressing the strip against the fixed gage prior to the making of a scroll cut, said movable gage comprising a pivotally mounted gage element having a strip engaging surface movable into and out of contact with the strip, spring means constantly tending to move said strip engaging surface away from the strip, and means operable by the shearing means just prior to the making of a scroll cut for moving said strip engaging surface against the strip.

3. In apparatus for cutting sheets having scrolled ends from a continuous strip of metal, scroll shearing means, gage stop means spaced a predetermined definite distance from the shearing means and presenting a simulated scroll abutment stop face, means for bringing about movement of a strip of metal through the shearing means and endwise against the gage stop means scroll abutment face to determine the length of sheet to be cut, means for operating the shearing means to cut a sheet from the strip having a scrolled edge at each of its leading and trailing edges, said gage stop means being arranged in cooperative relation to the scroll shearing means so as to be engageable by portions of the scroll cut advance end of the strip moved endwise thereagainst in a manner for gaging the end of the strip both endwise and widthwise preparatory to the making of a scroll cut, and means for moving the gage stop means into an effective position for intercepting and stopping said strip and out of said effective position for permitting the scrolled sheet to pass beyond said gage stop means, and gage means disposed adjacent and in advance of the shearing means and engageable with the side edges of the strip as it is being sheared for accurately placing the strip at the position of the shearing means preparatory to the making of a scroll cut, said last named means including a fixed gage engageable by the strip at one side and a movable gage movable against the other side of the strip for pressing the strip against the fixed gage prior to the making of a scroll cut, said movable gage comprising a pivotally mounted gage element having a strip engaging surface movable into and out of contact with the strip, spring means constantly tending to move said strip engaging surface away from the strip, and cam means attached to and movable with the shearing means in position for being operable just prior to the making of a scroll cut for moving said strip engaging surface against the strip.

4. In apparatus for cutting sheets having scrolled ends from a continuous strip of metal, scroll shearing means, gage stop means spaced a predetermined definite distance from the shearing means and presenting a simulated scroll abutment stop face, means for bringing about movement of a strip of metal through the shearing means and endwise against the gage stop means scroll abutment face to determine the length of sheet to be cut, means for operating the shearing means to cut a sheet from the strip having a scrolled edge at each of its leading and trailing edges, said gage stop means being arranged in cooperative relation to the scroll shearing means so as to be engageable by portions of the scroll cut advance end of the strip moved endwise thereagainst in a manner for gaging the end of the strip both endwise and widthwise preparatory to the making of a scroll cut, and means for moving the gage stop means into an effective position for intercepting and stopping said strip and out of said effective position for permitting the scrolled sheet to pass beyond said gage stop means, and gage means disposed adjacent and in advance of the shearing means and engageable with the side edges of the strip as it is being sheared for accurately placing the strip at the position of the shearing means prepreparatory to the making of a scroll cut, said last named means including a fixed gage movable against the other side of the strip for pressing the strip against the fixed gage prior to the making of a scroll cut, said shearing means including a vertically reciprocable shear member, said movable gage comprising a pivotally mounted gage element having a curved and eccentrically disposed gaging surface movable into and out of contact with the strip, an actuater rod and spring means engaging the same constantly tending to swing the movable gage element away from the strip, and a cam member movable with the reciprocable shear member and engageable with said rod for moving the gage element against the strip during each descent of the reciprocable shear so as to laterally gage the strip just prior to the making of each scroll cut.

5. In apparatus for cutting sheets having scrolled ends from a continuous strip of metal, scroll shearing means, gage stop means spaced a predetermined definite distance from the shearing means, means for bringing about movement of a strip of metal through the shearing means and endwise against the gage stop means to determine the length of sheet to be cut, means for operating the shearing means to cut a scrolled sheet from the strip, said gage stop means being so constructed and arranged as to be engageable by portions of the scroll cut end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, and means for causing the gage stop means to move a limited distance longitudinally with the strip as said strip approaches contact with the stop means as the intercepting and stopping of the strip is being accomplished.

6. In apparatus for cutting sheets having scrolled ends from a continuous strip of metal, scroll shearing means, gage stop means spaced a predetermined definite distance from the shearing means, means for bringing about movement of a strip of metal through the shearing means and endwise against the gage stop means to determine the length of sheet to be cut, means for operating the shearing means to cut a scrolled sheet from the strip, said gage stop means being so constructed and arranged as to be engageable by portions of the scroll cut end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, and means for causing the gage stop means to move a limited distance longitudinally with the strip and at a slower speed than the strip is travelling as said strip approaches contact with the stop means as the intercepting and stopping of the strip is being accomplished.

7. In apparatus for cutting sheets having scrolled ends from a continuous strip of metal, scroll shearing means including a stationary scroll die and a reciprocable scroll shear, gage stop means spaced a predetermined definite distance from the shearing means and presenting a simulated scroll abutment stop face, means for bringing about movement of a strip of metal through the shearing means and endwise against the gage stop means scroll abutment face to determine the length of sheet to be cut, means for operating the shearing means to cut a sheet from the strip having a scrolled edge at each of its leading and trailing edges, said gage stop means being arranged in cooperative relation to the scroll shearing means so as to be engageable by portions of the scroll cut advance end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, said means for bringing about movement of the strip including continuously operating feed rolls effective to continuously feed the strip and provide a slack hump therein in advance of the shearing means while each shearing operation is in progress, intermittently operable feed roll means effective to initiate the running out of the slack hump following each shearing operation so as to speed up the slack run out whereby it will be completed prior to final feeding of the strip against the gage stops by the continuously operating feed rolls, and means for causing the gage stop means to move a limited distance longitudinally with the strip as said strip approaches contact with the stop means as the intercepting and stopping of the strip is being accomplished.

8. In apparatus for cutting sheets having scrolled ends from a continuous strip of metal, scroll shearing means including a stationary scroll die and a reciprocable scroll shear, gage stop means spaced a predetermined definite distance from the shearing means and presenting a simulated scroll abutment stop face, means for bringing about movement of a strip of metal through the shearing means and endwise against the gage stop means scroll abutment face to determine the length of sheet to be cut, means for operating the shearing means to cut a sheet from the strip having a scrolled edge at each of its leading and trailing edges, said gage stop means being arranged in cooperative relation to the scroll shearing means so as to be engageable by portions of the scroll cut advance end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, said means for bringing about movement of the strip including continuously operating feed rolls effective to continuously feed the strip and provide a slack hump therein in advance of the shearing means while each shearing operation is in progress, and intermittently operable feed roll means effective to initiate the running out of the slack hump at a higher rate than the feed travel of the strip following each shearing operation so as to speed up the slack run out and bring about completion thereof prior to final feeding of the strip against the gage stops at the slower rate by the continuously operating feed rolls, a clamp bar, spring means constantly tending to press the bar in clamping contact with the strip, said intermittently operable feed roll means including a continuously driven roll and an idler roll movable toward and from said driven roll, spring means constantly tending to move the idler roll against said driven roll, plunger means connected with the idler roll, plunger means connected with the clamp bar, lifter levers connected with each plunger means, and cam means operable in timed relation to the gaging means and the shearing means to engage said levers and effect a lifting of the clamp bar after completion of each shearing operation and a lowering thereof after each gaging operation and before each shearing operation and to engage said levers and effect a lifting of the idler roll while the clamp bar is lowered and for lowering said idler roll while the clamp bar is lowered and for lowering said idler roll momentarily just after each lifting of the clamp bar.

9. In apparatus for cutting sheets having scrolled ends from a continuous strip of metal, scroll shearing means, gage stop means spaced a predetermined definite distance from the shearing means and presenting a simulated scroll abutment stop face, means for bringing about movement of a strip of metal through the shearing means and endwise against the gage stop means scroll abutment face to determine the length of sheet to be cut, means for operating the shearing means to cut a sheet from the strip having a scrolled edge at each of its leading and trailing edges, said gage stop means being arranged in cooperative relation to the scroll shearing means so as to be engageable by portions of the scroll cut advance end of the strip moved endwise thereagainst in a manner for gaging the end of the strip both endwise and widthwise preparatory to the making of a scroll cut, and means for moving the gage stop means into an effective position for intercepting and stopping said strip and out of said effective position for permitting the scrolled sheet to pass beyond said gage stop means, said stop means being vertically movable into and out of effective position and mounted on a transverse carrier member, and there being also included brackets having vertical guideways in which said carrier member is guided, and rotary cam means operable in timed relation to the shearing means for controlling vertical reciprocation of said gage stop means.

10. In apparatus for cutting sheets having scrolled ends from a continuous strip of metal, scroll shearing means, gage stop means spaced a predetermined definite distance from the shearing means, means for bringing about movement of a strip of metal through the shearing means and endwise against the gage stop means to determine the length of sheet to be cut, means for operating the shearing means to cut a scrolled sheet from the strip, said gage stop means being so constructed and arranged as to be engageable by portions of the scroll cut end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, and means for causing the gage stop means to move a limited distance longitudinally with the strip as said strip approaches contact with the stop means as the intercepting and stopping of the strip is being accomplished, said gage stop means being mounted on a transverse carrier member, and there being also included brackets having vertical guideways in which said carrier member is guided, rotary cam means operable in timed relation to the shearing means for controlling vertical reciprocation of said gage stop means, and the means for causing the gage stop means to move a limited distance with the strip including means supporting the brackets for longitudinal movement and rotary cam means for controlling movement of the brackets on said supporting means.

11. In apparatus for cutting sheets having scrolled ends from a continuous strip of metal, scroll shearing means, gage stop means spaced a predetermined definite distance from the shearing means and presenting a simulated scroll abutment stop face, means for bringing about movement of a strip of metal through the shearing means and endwise against the gage stop means scroll abutment face to determine the length of sheet to be cut, means for operating the shearing means to cut a sheet from the strip having a scrolled edge at each of its leading and trailing edges, said gage stop means being arranged in cooperative relation to the scroll shearing means so as to be engageable by portions of the scroll cut advance end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, conveyor belt means for feeding cut sheets away from the shearing means, rails for receiving and supporting the strip as it is being gaged, and means for lifting and lowering said rails to alternately present the supporting edges thereof above the belt means in position to support the strip in gaging position before the shearing operation, and below the belt means after the gaging operation so that the cut sheet will engage upon and be fed away by said belt means.

12. In apparatus for cutting sheets having scrolled ends from a continuous strip of metal, scroll shearing means including a stationary scroll die and a reciprocable scroll shear, gage stop means spaced a predetermined definite distance from the shearing means, means for bringing about movement of a strip of metal through the shearing means and endwise against the gage stop means to determine the length of sheet to be cut, means for operating the shearing means to cut a scrolled sheet from the strip, said gage stop means being so constructed and arranged as to be engageable by portions of the scroll cut end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, said means for bringing about movement of the strip including continuously operating feed rolls effective to continuously feed the strip and provide a slack hump therein in advance of the shearing means while each shearing operation is in progress, intermittently operable feed roll means effective to initiate the running out of the slack hump following each shearing operation so as to speed up the slack run out whereby it will be completed prior to final feeding of the strip against the gage stops by the continuously operating feed rolls, conveyor belt means for feeding cut sheets away from the shearing means, rails for receiving and supporting the strip as it is being gaged, and means for lifting and lowering said rails to alternately present the supporting edges thereof above the belt means in position to support the strip in gaging position before the shearing operation, and below the belt means after the gaging operation so that the cut sheet will engage upon and be fed away by said belt means.

13. In apparatus for cutting sheets having scrolled ends from a continuous strip of metal, scroll shearing means, gage stop means spaced a predetermined definite distance from the shearing means and presenting a simulated scroll abutment stop face, means for bringing about movement of a strip of metal through the shearing means and endwise against the gage stop means scroll abutment face to determine the length of sheet to be cut, means for operating the shearing means to cut a sheet from the strip having a scrolled edge at each of its leading and trailing edges, said gage stop means being arranged in cooperative relation to the scroll shearing means so as to be engageable by portions of the scroll cut advance end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, conveyor belt means for feeding cut sheets away from the shearing means, rails for receiving and supporting the strip as it is being gaged, and means for lifting and lowering said rails to alternately present the supporting edges thereof above the belt means in position to support the strip in gaging position before the shearing operation, and below the belt means after the gaging operation so that the cut sheet will engage upon and be fed away by said belt means, said gage stop means being mounted on a transverse carrier member, and there being also included brackets having vertical guideways in which said carrier member is guided and rotary cam means operable in timed relation to the shearing means for controlling vertical reciprocation of the stop means to place the same above the tops of the rails when said rails are elevated and below the belts when said rails and said gage means are lowered.

14. In apparatus for cutting sheets having scrolled ends from a continuous strip of metal, scroll shearing means, gage stop means spaced a predetermined definite distance from the shearing means, means for bringing about movement of a strip of metal through the shearing means and endwise against the gage stop means to determine the length of sheet to be cut, means for operating the shearing means to cut a scrolled sheet from the strip, said gage stop means being so constructed and arranged as to be engageable by portions of the scroll cut end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, means for causing the gage stop means to move a limited distance longitudinally with the strip as said strip approaches contact with the stop means as the intercepting and stopping of the strip is being accomplished, conveyor belt means for feeding cut sheets away from the shearing means, rails for receiving and supporting the strip as it is being gaged, and means for lifting and lowering said rails to alternately present the supporting edges thereof above the belt means in position to support the strip in gaging position before the shearing operation, and below the belt means after the gaging operation so that the cut sheet will engage upon and be fed away by said belt means, said gage stop means being mounted on a transverse carrier member, and there being also included brackets having vertical guideways in which said carrier member is guided and rotary cam means operable in timed relation to the shearing means for controlling vertical reciprocation of the stop means to place the same above the tops of the rails when said rails are elevated and below the belts when said rails and said gage means are lowered, and said means for causing the gage stop means to move a limited distance with the strip including means supporting the brackets for longitudinal movement, and rotary cam means for controlling movement of the brackets on said supporting means.

15. In apparatus for cutting sheets having scrolled ends from a continuous strip of metal, scroll shearing means, gage stop means spaced a predetermined definite distance from the shearing means and presenting a simulated scroll abutment stop face, means for bringing about movement of a strip of metal through the shearing means and endwise against the gage stop means scroll abutment face to determine the length of sheet to be cut, means for operating the shearing means to cut a sheet from the strip having a scrolled edge at each of its leading and trailing edges, said gage stop means being arranged in cooperative relation to the scroll shearing means so as to be engageable by portions of the scroll cut advance end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, conveyor belt means for feeding cut sheets away from the shearing means, rails for receiving and supporting the strip as it is being gaged, and means for lifting and lowering said rails to alternately present the supporting edges thereof above the belt means in position to support the strip in gaging position before the shearing operation, and below the belt means after the gaging operation so that the cut sheet will engage upon and be fed away by said belt means, said lifting and lowering means comprising a frame on which the rails are mounted two sets of transversely aligned pairs of bell crank levers each lever of which has a generally horizontally disposed arm and a generally vertically disposed arm and the sets of levers being reversely positioned and so placed that the free ends of two generally horizontally disposed arms extend away from each other at each side of the apparatus, means connecting said frame to the free ends of said generally horizontally disposed arms, and rotary cam means engageable with and between the two generally vertically disposed arms at each side of the apparatus.

16. In apparatus for cutting sheets having scrolled ends from a continuous strip of metal, scroll shearing means, gage stop means spaced a predetermined definite distance from the shearing means, means for bringing about movement of a strip of metal through the shearing means and endwise against the gage stop means to determine the length of sheet to be cut, means for operating the shearing means to cut a scrolled sheet from the strip, said gage stop means being so constructed and arranged as to be engageable by portions of the scroll cut end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, means for causing the gage stop means to move a limited distance longitudinally with the strip as said strip approaches contact with the stop means as the intercepting and stopping of the strip is being accomplished, conveyor belt means for feeding cut sheets away from the shearing means, rails for receiving and supporting the strip as it is being gaged, and means for lifting and lowering said rails to alternately present the supporting edges thereof above the belt means in position to support the strip in gaging position before the shearing operation, and below the belt means after the gaging operation so that the cut sheet will engage upon and be fed away by said belt means, said lifting and lowering means comprising a frame on which the rails are mounted, two sets of transversely aligned pairs of bell crank levers each lever of which has a generally horizontally disposed arm and a generally vertically disposed arm and the sets of levers being reversely positioned and so placed that the free ends of two generally horizontally disposed arms extend away from each other at each side of the apparatus, means connecting said frame to the free ends of said generally horizontally disposed arms, and rotary cam means engageable with and between the two generally vertically disposed arms at each side of the apparatus, and said means for causing the gage stop means to move a limited distance with the strip including means supporting the brackets for longitudinal movement, and rotary cam means for controlling movement of the brackets on said supporting means.

17. In apparatus for cutting sheets having scrolled ends from a continuous strip of metal, scroll shearing means, gage stop means spaced a predetermined definite distance from the shearing means, means for bringing about movement of a strip of metal through the shearing means and endwise against the gage stop means to determine the length of sheet to be cut, means for operating the shearing means to cut a scrolled sheet from the strip, said gage stop means being so constructed and arranged as to be engageable by portions of the scroll cut end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, means for causing the gage stop means to move a limited distance longitudinally with the strip as said strip approaches contact with the stop means as the intercepting and stopping of the strip is being accomplished, conveyor belt means for feeding cut sheets away from the shearing means, rails for receiving and supporting the strip as it is being gaged, and means for lifting and lowering said rails to alternately present the supporting edges thereof above the belt means in position to support the strip in gaging position before the shearing operation, and below the belt means after the gaging operation so that the cut sheet will engage upon and be fed away by said belt means, said lifting and lowering means comprising a frame on which the rails are mounted, two sets of transversely aligned pairs of bell crank levers each lever of which has a generally horizontally disposed arm and a generally vertically disposed arm and the sets of levers being reversely positioned and so placed that the free ends of two generally horizontally disposed arms extend away from each other at each side of the apparatus, means connecting said frame to the free ends of said generally horizontally disposed arms, and rotary cam means engageable with and between the two generally vertically disposed arms at each side of the apparatus, said means for moving the gage stops comprising a transverse carrier member on which the gage stops are mounted and means for mounting said carrier member on said frame for vertical movement therewith and longitudinal movement relative thereto, and said means for causing the gage stop means to move a limited distance with the strip including means supporting the brackets for longitudinal movement, and rotary cam means for controlling movement of the brackets on said supporting means.

18. In apparatus for cutting sheets having scrolled ends from a continuous strip of metal, scroll shearing means, gage stop means spaced a predetermined definite distance from the shearing means and presenting a simulated scroll abutment stop face, means for bringing about movement of a strip of metal through the shearing means and endwise against the gage stop means scroll abutment face to determine the length of sheet to be cut, means for operating the shearing means to cut a sheet from the strip having a scrolled edge at each of its leading and trailing edges, said gage stop means being arranged in cooperative relation to the scroll shearing means so as to be engageable by portions of the scroll cut advance end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, conveyor belt means for feeding cut sheets away from the shearing means, rails for receiving and supporting the strip as it is being gaged, means for lifting and lowering said rails to alternately present the supporting edges thereof above the belt means in position to support the strip in gaging position before the shearing operation, and below the belt means after the gaging operation so that the cut sheet will engage upon and be fed away by said belt means, and means for causing the gage stop means to move upwardly and downwardly with the rails.

19. In apparatus for cutting sheets having scrolled ends from a continuous strip of metal, scroll shearing means, gage stop means spaced a predetermined definite distance from the shearing means and presenting a simulated scroll abutment stop face, means for bringing about movement of a strip of metal through the shearing means and endwise against the gage stop means scroll abutment face to determine the length of sheet to be cut, means for operating the shearing means to cut a sheet from the strip having a scrolled edge at each of its leading and trailing edges, said gage stop means being arranged in cooperative relation to the scroll shearing means so as to be engageable by portions of the scroll cut advance end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, conveyor belt means for feeding cut sheets away from the shearing means, rails for receiving and supporting the strip as it is being gaged, means for lifting and lowering said rails to alternately present the supporting edges thereof above the belt means in position to support the strip in gaging position below the shearing operation, and below the belt means after the gaging operation so that the cut sheet will engage upon and be fed away by said belt means, means for causing the gage stop means to move upwardly and downwardly with the rails, and means for causing the gage stop means to move a limited distance longitudinally with the strip, and relative to said rails as the intercepting and stopping of the strip is being accomplished.

20. In apparatus for cutting sheets having scrolled ends from a continuous strip of metal, scroll shearing means, gage stop means spaced a predetermined definite distance from the shearing means and presenting a simulated scroll abutment stop face, means for bringing about movement of a strip of metal through the shearing means and endwise against the gage stop means scroll abutment face to determine the length of sheet to be cut, means for operating the shearing means to cut a sheet from the strip having a scrolled edge at each of its leading and trailing edges, said gage stop means being arranged in cooperative relation to the scroll shearing means so as to be engageable by portions of the scroll cut advance end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, conveyor belt means for feeding cut sheets away from the shearing means, rails for receiving and supporting the strip as it is being gaged, means for lifting and lowering said rails to alternately present the supporting edges thereof above the belt means in position to support the strip in gaging position before the shearing operation, and below the belt means after the gaging operation so that the cut sheet will engage upon and be fed away by said belt means, and stripper means supported at a fixed level and effective to prevent dragging of strip portions downwardly below the level of the belt means during the lowering of the gage stop means.

21. In apparatus for cutting sheets having scrolled ends from a continuous strip of metal, scroll shearing means, gage stop means spaced a predetermined definite distance from the shearing means and presenting a simulated scroll abutment stop face, means for bringing about movement of a strip of metal through the shearing means and endwise against the gage stop means scroll abutment face to determine the length of sheet to be cut, means for operating the shearing means to cut a sheet from the strip having a scrolled edge at each of its leading and trailing edges, said gage stop means being arranged in cooperative relation to the scroll shearing means so as to be engageable by portions of the scroll cut advance end of the strip moved endwise thereagainst in a manner for gaging the end of the strip both endwise and widthwise preparatory to the making of a scroll cut, means for moving the gage stop means into an effective position for intercepting and stopping said strip and out of said effective position for permitting the scrolled sheet to pass beyond said gage stop means, conveyor belt means for feeding cut sheets away from the shearing means, rails for receiving and supporting the strip as it is being gaged, means for lifting and lowering said rails to alternately present the supporting edges thereof above the belt means in position to support the strip in gaging position before the shearing operation, and below the belt means after the gaging operation so that the cut sheet will engage upon and be fed away by said belt means, means for causing the gage stop means to move upwardly and downwardly with the rails, means for causing the gage stop means to move a limited distance longitudinally with the strip, and relative to said rails as the intercepting and stopping of the strip is being accomplished and stripper means movable longitudinally with the gage stop and supported at a fixed level and effective to prevent dragging of strip portions downwardly below the level of the belt means during the lowering of the gage stop means.

22. In apparatus of the character described, shearing means, clamping means for securing a strip while it is being sheared, and feeding means for starting the strip away from the shearing means after it has been sheared, said clamping means comprising a clamp bar, said feeding means comprising a continuously rotating roll and an idler roll adapted to be pressed against the strip and to press the strip against the rotating roll at each feed interval, a housing, end caps on the housing having bearings thereon, a cam shaft rotatable in said bearings, a pair of first guides on the housing, plungers vertically slidable in said first guides and attached to the clamp bar, lifter levers pivoted opposite said first guides on the housing and having their free ends extended into said guides and connected with the plungers therein, a pair of second guides, plungers vertically slidable in said second guides, lifter levers pivoted opposite said second guides and having their free ends extended into the second guides and connected with the plungers therein, tappets depending from all of the levers into the interior of the housing, spring means engaging the plungers in the housings and constantly urging them downwardly, and cams on the cam shaft and engaging the tappets for at the proper times lifting said plungers and the clamp bar and idler roll attached thereto.

23. In apparatus of the character described, a frame, shearing means, gage stop means spaced a predetermined definite distance from the shearing means, means for bringing about movement of a strip of metal through the shearing means and endwise against the gage stop means to determine the length of sheet to be cut, means for operating the shearing means to cut sheets from the strip, and means for moving the gage stop means into an effective position for intercepting and stopping said strip and out of said effective position for permitting the scrolled sheet to pass beyond said gage stop means, trackways, a separate frame rollable over said trackways into and out of cooperative relation to the first mentioned frame and supporting thereon said gage stop means and the gage stop means moving means as a gaging unit, thereby permitting movement away of the gaging unit to render the shearing means readily accessible, means for accurately locating said unit with respect to the shearing means, and means for releasably securing said frame in cooperative relation.

24. In apparatus of the character described, a frame, shearing means, gage stop means spaced a predetermined definite distance from the shearing means, means for bringing about movement of a strip of metal through the shearing means and endwise against the gage stop means to determine the length of sheet to be cut, means for operating the shearing means to cut sheets from the strip, and means for moving the gage stop means into an effective position for intercepting and stopping said strip and out of said effective position for permitting the scrolled sheet to pass beyond said gage stop means, trackways, a separate frame rollable over said trackways into and out of cooperative relation to the first mentioned frame and supporting thereon said gage stop means and the gage stop means moving means as a gaging unit, thereby permitting movement away of the gaging unit to render the shearing means readily accessible, means for accurately locating said unit with respect to the shearing means, means for releasably securing said frame in cooperative relation, said gaging unit including belt conveyor means for feeding away sheets cut from the strip by the shearing means, and the first mentioned frame being provided with a clearance adjacent to the shearing means effective to permit close placement of the receiving end of the belt conveyor means with respect to said shearing means when the gaging unit is secured in operative position.

25. In apparatus of the character described, a frame, shearing means, gage stop means spaced a predetermined definite distance from the shearing means, means for bringing about movement of a strip of metal through the shearing means and endwise against the gage stop means to determine the length of sheet to be cut, means for operating the shearing means to cut sheets from the strip, and means for moving the gage stop means into an effective position for intercepting and stopping said strip and out of said effective position for permitting the scrolled sheet to pass beyond said gage stop means, trackways, a separate frame rollable over said trackways into and out of cooperative relation to the first mentioned frame and supporting thereon said gage stop means and the gage stop means moving means as a gaging unit, thereby permitting movement away of the gaging unit to render the shearing means readily accessible, means for accurately locating said unit with respect to the shearing means, means for releasably securing said frame in cooperative relation, said means for operating the shearing means and the means for moving the gage stop means operating in timed relation and including driving connections which are readily separable to permit movement of the gaging unit away from said first mentioned frame and which are again brought into cooperative relation when the gaging unit is returned to its cooperative relation to said first mentioned frame, and means for operatively connecting said separable driving connections only in such position as will restore the proper timing relation of said shearing means and said gage stop means.

26. In apparatus of the character described, a frame, shearing means, gage stop means spaced a predetermined definite distance from the shearing means, means for bringing about movement of a strip of metal through the shearing means and endwise against the gage stop means to determine the length of sheet to be cut, means for operating the shearing means to cut sheets from the strip, and means for moving the gage stop means into an effective position for intercepting and stopping said strip and out of said effective position for permitting the scrolled sheet to pass beyond said gage stop means, trackways, a separate frame rollable over said trackways into and out of cooperative relation to the first mentioned frame and supporting thereon said gage stop means and the gage stop means moving means as a gaging unit, thereby permitting movement away of the gaging unit to render the shearing means readily accessible, means for accurately locating said unit with respect to the shearing means, means for releasably securing said frame in cooperative relation, said means for operating the shearing means and the means for moving the gage stop means operating in timed relation and including a shaft composed of two axially aligned sections one having rotative bearing on the first mentioned frame and the other having rotative bearing on said separate gaging unit frame so that the sections can move apart as said unit is moved away from the first mentioned frame and back into cooperative axially aligned relation when said unit is returned to its cooperative relation to said first mentioned frame, shaft section coupling means carried by the shaft sections, and means for connecting said coupling means only in such position as will restore proper timing relation of said shearing means and said gage stop means.

SCOTT R. JOHNSON.
JAMES M. ROYAL.
HERBERT SCHRADER.

REFERENCES CITED

The following references are of record in the file of this patent:

UNITED STATES PATENTS

| Number | Name | Date |
|---|---|---|
| 237,303 | Miller | Feb. 1, 1881 |
| 1,110,810 | McDonald | Sept. 15, 1914 |
| 1,936,088 | Howe | Nov. 21, 1933 |
| 1,982,880 | Pachter | Dec. 4, 1934 |
| 2,101,083 | Mercer | Dec. 7, 1937 |
| 2,156,049 | Boerger | Apr. 25, 1939 |
| 2,219,060 | West | Oct. 22, 1940 |
| 2,223,767 | Lloyd | Dec. 3, 1940 |
| 2,314,367 | Pearson | Mar. 23, 1943 |
| 2,346,194 | Sjostrom | Apr. 11, 1944 |